United States Patent [19]

Patmore et al.

[11] 3,823,871

[45] July 16, 1974

[54] AIR TURBULENCE SIMULATION APPARATUS

[75] Inventors: James R. Patmore, Neptune; Joseph E. Sidoti, Red Bank, both of N.J.

[73] Assignee: Electronic Associates, Inc., Long Branch, N.J.

[22] Filed: Apr. 16, 1973

[21] Appl. No.: 351,246

[52] U.S. Cl. .................. 235/197, 235/184, 35/10.2
[51] Int. Cl. ...................... G06g 7/26, G06g 7/72
[58] Field of Search ............... 235/184, 197, 193; 35/10.2

[56] References Cited
UNITED STATES PATENTS

| | | | |
|---|---|---|---|
| 2,784,501 | 3/1957 | Stern et al. | 235/184 |
| 3,025,000 | 3/1962 | Taback | 235/193 X |
| 3,028,090 | 4/1962 | Fogarty et al. | 235/184 |
| 3,031,775 | 5/1962 | Cohen | 35/12 |
| 3,077,557 | 2/1963 | Joline et al. | 318/489 |
| 3,130,301 | 4/1964 | Minter | 235/193 |
| 3,150,327 | 9/1964 | Taylor | 330/126 |
| 3,261,970 | 7/1966 | Snyder | 235/184 |
| 3,299,197 | 1/1967 | Cutler | 235/184 |
| 3,513,246 | 5/1970 | Fisch et al. | 35/10.2 |

*Primary Examiner*—Malcolm A. Morrison
*Assistant Examiner*—Edward J. Wise

[57] ABSTRACT

Air turbulence simulation apparatus for providing pitch turbulence signals for simulating pitch turbulence and for providing roll turbulence signals for simulating roll turbulence, such apparatus including first means for providing first signals at a first predetermined frequency; second means for providing second signals at a second predetermined frequency; the second predetermined frequency being lower than the first predetermined frequency; summing means for receiving and summing the first and second signals and for providing third signals which are the sum of the first and second signals; coupling means for receiving the third signals and for providing the pitch turbulence signals and the roll turbulence signals; such simulation apparatus may also include differentiating means for receiving the third signals and for differentiating the third signals to provide the roll turbulence signals whereby the differentiated roll turbulence signals are of shorter duration than the pitch turbulence signals.

7 Claims, 2 Drawing Figures

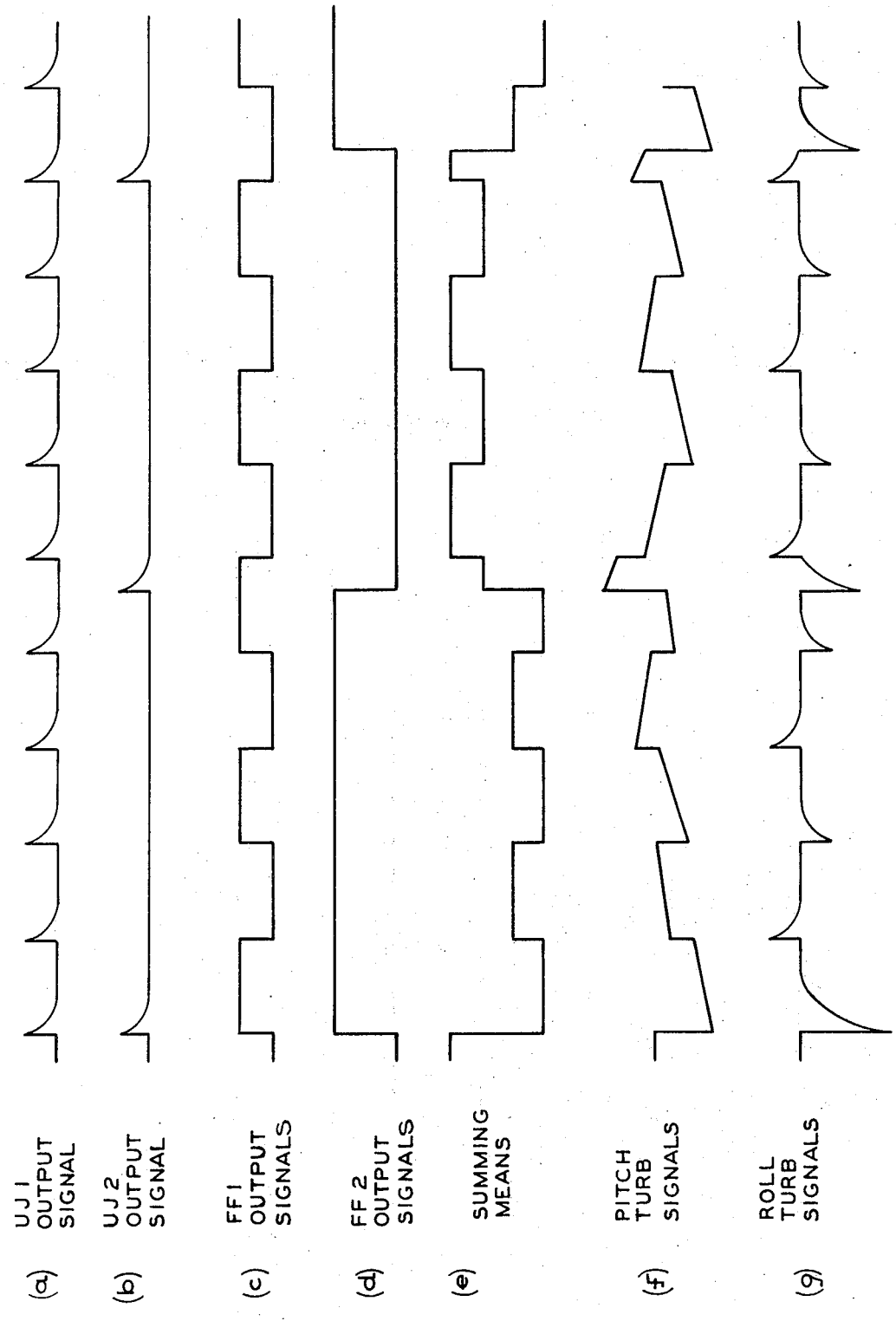

AIR TURBULENCE SIMULATION APPARATUS

BACKGROUND OF THE INVENTION

As known to those skilled in the flight simulator art, various flight simulators are known to the prior art which simulate air turbulence.

The prior art apparatus for simulating air turbulence has been typically comprised of electromechanical apparatus which simulates air turbulence by changing only the compass heading of the flight simulator. However, as known to those skilled in the art, air turbulence produces at least two turbulences, namely, pitch turbulence and roll turbulence, and such turbulences in actual flight, affect more than merely the compass heading of the aircraft. Accordingly, there exists a need in the art for electrical apparatus for simulating both pitch turbulence and roll turbulence at a flight simulator and which affect more than merely the compass heading of the flight simulator.

SUMMARY

In accordance with the teaching of the present invention, air turbulence simulation apparatus is provided for providing pitch turbulence signals to a flight simulator for simulating pitch turbulence, and for providing roll turbulence signals to a flight simulator for simulating roll turbulence.

Further, the pitch turbulence signals and the roll turbulence signals may be made to have differing durations so as to more accurately reflect the differing flight conditions at a flight simulator that are actually experienced by an aircraft in flight upon actually experiencing both pitch and roll turbulences.

DESCRIPTION OF THE DRAWING

FIG. 2 is a drawing illustrating the relative signals present at various points in the apparatus of FIG. 1.

DESCRIPTION OF THE INVENTION

Figure 1:
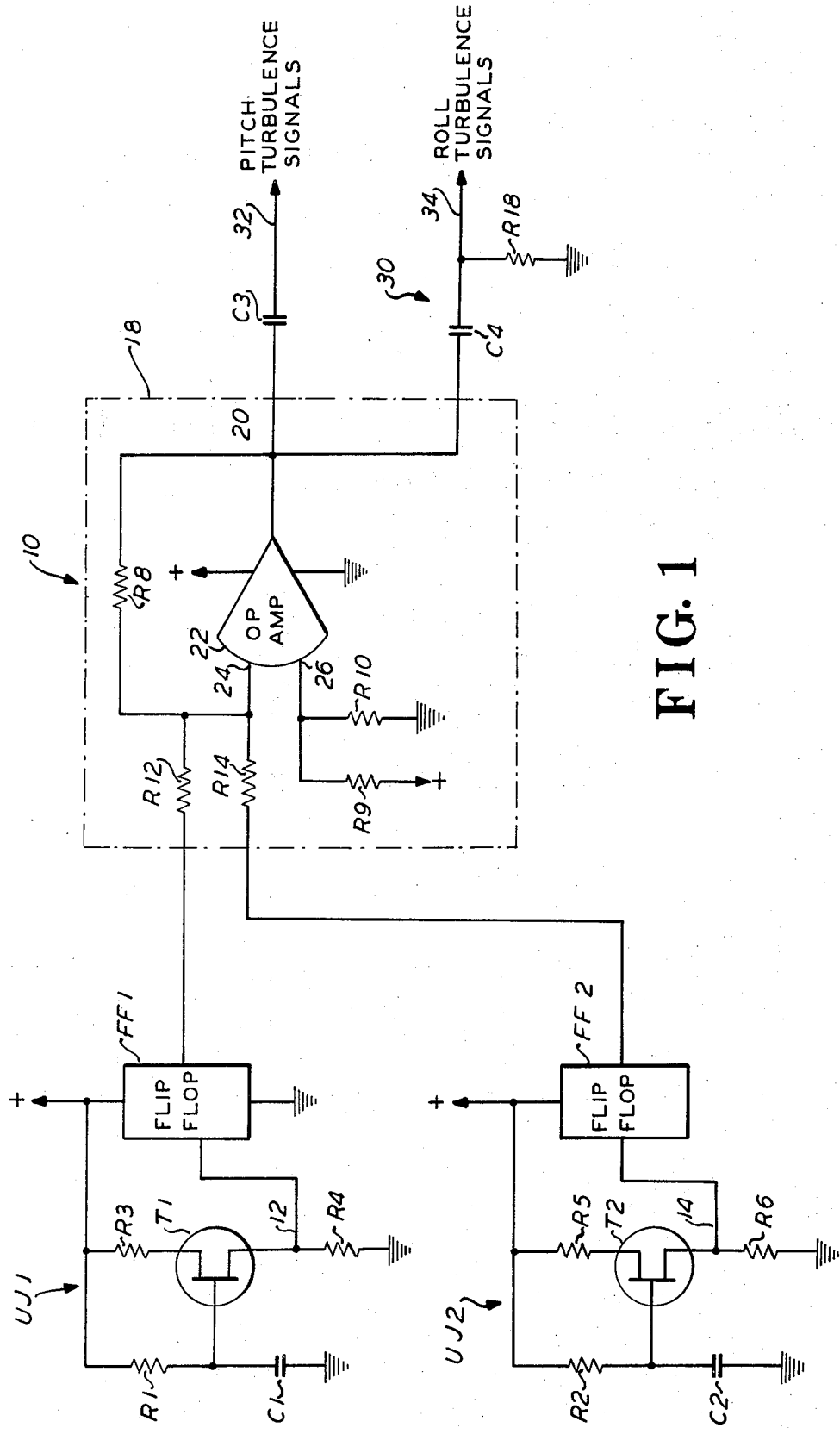
FIG. 1 is a schematic of air turbulence simulation apparatus embodying the present invention.

Referring now to FIG. 1, there is shown air turbulence simulation apparatus indicated by general numerical designation 10 for providing pitch turbulence signals to a flight simulator to simulate pitch turbulence, and also for providing roll turbulence signals to a flight simulator to simulate roll turbulence.

The air turbulence apparatus 10 includes a pair of uni-junction oscillators, identified respectively as UJ1 and UJ2 and which uni-junction oscillators include respective uni-junction transistors T1 and T2. Each uni-junction oscillator includes an associated resistor-capacitor network as shown, with resistor R1 and capacitor C1 providing the time constant of uni-junction oscillator UJ1, and with resistor R2 and capacitor C2 providing the time constant for uni-junction oscillator UJ2. In accordance with the teaching of the present invention, the uni-junction oscillators UJ1 and UJ2 operate at different frequencies as will be further explained below, and hence, the respective time constants provided by resistor R1 and C2 and resistor R2 and C2 are of different values. In one embodiment of the present invention, uni-junction oscillator UJ1 was operated approximately 4.5 times faster than uni-junction oscillator UJ2, as may be seen from FIGS. 2(a) and 2(b), which FIGS. are illustrations of the output signals provided by uni-junction oscillators UJ1 and UJ2 at points 12 and 14 of FIG. 1, respectively.

Referring again to FIG. 1, the output signals of uni-junction oscillators UJ1 and UJ2 are fed into flip flop circuits FF1 and FF2, as ashown, the respective circuits connected uni-junction oscillators and flip flop circuits being connected in series as shown. The flip flop circuits FF1 and FF2 may be, for example, suitable transistorized flip flop circuits or may be semiconductive chip circuits. The flip flop circuits receive the output signals from the respective uni-junction oscillators and provide square wave signals, as shown in FIGS. 2(c) and (d), having the same frequencies as the respective associated output signals of the uni-junction oscillators.

Further, the air turbulence simulation apparatus of the present invention includes summing means for receiving and summing the output signals of the flip flop circuits FF1 and FF2, and such summing means are included in the dashed outline in FIG. 1 bearing numerical designation 18. The sum of the outputs of the flip flops FF1 and FF2 is provided at point 20 in the summing means 18 and such output signal from the summing means is shown in FIG. 2(e).

More particularly, and in accordance with the further teaching of the present invention, the summing means 18 may be amplification and summing means and hence may include a suitable operational amplifier 22 provided with a feedback circuit having resistor R8 connected therein, an inverting input 24, a non-inverting input 26, and the output 20. Connected to the non-inverting input 26 are resistors R9 and R10 which, as shown, are interconnected to a suitable power supply and ground to provide a predetermined voltage input at the non-inverting input 26 to thereby set the operating point of the operational amplifier 22. The means 18 may further include resistors R12 and R14, which, as shown in FIG. 1, are connected in parallel with one end thereof being connected to the inverting input 24 of the operational amplifier 22, and with the other ends of the resistors R12 and R14 being connected to the respective flip flop circuits FF1 and FF2. Such interconnections of the resistors R12 and R14 couple the output signals of the flip flop circuits FF1 and FF2 to the inverting input 24 of the operational amplifier 28.

With further regard to resistors R12 and R14, it will be understood by those skilled in the art, that such resistors are of different values whereby such resistors, respectively, in combination with feedback resistor R8, provide different amounts of gain to the respective outputs of the flip flop circuits FF1 and FF2; such difference in gain facilitating providing the output signals of the means 18 with substantially non-repetitive patterns. However, it will be further understood by those skilled in the art, that such difference in gain, in combination with the aforementioned difference in frequencies between the output signals of the uni-junction oscillators UJ1 and UJ2, further provide the summing means output signal with a substantially non-repetitive pattern. Accordingly, the output signal of the summing means 18 is a function not only of the difference in frequencies between the uni-junction oscillators but is also a function of the difference in gain (amplitude) provided by the resistors R12 and R14 in combination with resistor R8, and hence, the output signal of the summing means 18, appearing at point 20, closely approximates a random signal, such output signal being shown in FIG. 2 at (e). The output signals at point 20 may be utilized to provide both the pitch turbulence signals and the roll turbulence signals.

As is further shown in FIG. 1, and in accordance with the further teaching of the present invention, the air turbulence apparatus of the present invention may further include a coupling capacitor C3 connected to the summing means output 20, and differentiating means, indicated by numerical designation 30, including capacitor C4 and resistor R18 also connected to output 20.

The coupling capacitor C3 receives the output signal from the summing means 18, which output signal as understood by those skilled in the art may include a DC level, and the coupling capacitor C3 blocks any such DC level and thereby provides pitch turbulence signals at point 32 which pitch turbulence signals are shown in FIG. 2 at (f).

The differentiating means 30 receives the output signals from the summing means 18 and differentiates such signals to provide roll turbulence signals at point 34 which roll turbulence signals are shown in FIG. 2 at (g). It will be understood by those skilled in the art that the time constant of the differentiating means 30, which time constant is determined by capacitor C4 and resistor R18, is long as compared to the periods of the output signals of the uni-junction oscillators UJ1 and UJ2 (shown at FIG. 2(a) and (b)) and hence, it will be noted further, as shown in FIGS. 2(f) and (g), that the duration of the roll turbulence signals is shorter than the duration of the pitch turbulence signals.

Referring again to FIG. 2(e), that is, the output signal of the summing means 18, it will be understood that the ratio of the frequency of the uni-junction oscillator UJ1 to the frequency of uni-junction oscillator UJ2 may be chosen to be not an even integer so as to further provide the output signal of the summing means 18 with a substantially non-repetitive pattern.

As will be understood by those skilled in the art, the provision of a non-repetitive pattern to the output signals of the summing means 18, and hence to the pitch and roll signals, provides a highly desirable, approximately random quality to the pitch and roll signals and thereby prevents the operator of the air turbulence simulation apparatus of the present invention from anticipating the simulated pitch and roll turbulence, and hence, the operator experiences increased realism with regard to the effect of actual air turbulence on an aircraft.

It will be understood by those skilled in the art that many modifications and variations may be made in the present invention without departing from the spirit and scope thereof.

What is claimed is:

1. Air turbulence a simulation apparatus for providing pitch turbulence signals for simulating pitch turbulence and for providing roll turbulence signals for simulating roll turbulence, comprising:
first means for providing first signals at a first predetermined frequency;
second means for providing second signals at a second predetermined frequency;
said second predetermined frequency being lower than said first predetermined frequency;
amplification and summing means for receiving said first and second signals and for amplifying and providing said first and second signals with different amounts of gain and for summing said first and second signals amplified with said different amounts of gain to provide third signals and which third signals provide both said pitch turbulence signals and said roll turbulence signals; and
said difference in frequencies of said first and second signals and said different amounts of gain provided to said first and second signals providing, in combination, said third signals with a substantially non-repetitive pattern.

2. Air turbulence simulation apparatus for providing pitch turbulence signals for simulating pitch turbulence and for providing roll turbulence signals for simulating roll turbulence, comprising:
first means for providing first signals at a first predetermined frequency;
second means for providing second signals at a second predetermined frequency;
said second predetermined frequency being lower than said first predetermined frequency;
summing means for receiving and summing said first and second signals and for providing third signals which are the sum of said first and second signals;

coupling means for receiving said third signals and for providing said pitch turbulence signals; and
differentiating means for receiving said third signals and for differentiating said third signals to provide said roll turbulence signals, said roll turbulence signals being of shorter duration than said pitch turbulence signals.

3. Apparatus according to claim 2 wherein said differentiating means has a predetermined time constant which is long as compared to the periods of said first and second signals whereby said roll turbulence signals are made of said shorter duration than said pitch turbulence signals.

4. Apparatus according to claim 2 wherein each of said first means and said second means for providing said first and second signals includes a uni-junction oscillator and a flip flop circuit connected in series, said uni-junction oscillator including a uni-junction transistor and a resistor-capacitor network providing a predetermined time constant for determining the frequency of said uni-unction oscillator.

5. Apparatus according to claim 2 wherein said summing means includes an operational amplifier provided with a feedback circuit having a first resistor connected therein, an inverting input, a non-inverting input and an output, and wherein said summing means further includes second and third resistors connected in parallel with one end thereof connected to said inverting input of said operational amplifier and wherein the other end of said second and third resistors are connected to respective ones of said flip flop circuits whereby said first and second signals are fed into said inverting input of said operational amplifier and whereby said third signals are provided at said output of said operational amplifier.

6. Apparatus according to claim 5 wherein said second and third resistors are of different values whereby the gain provided respectively to said first and said second signals by said operational amplifier is of different values due to the different gains provided by said second and said third resistors, respectively, in combination with said first resistor, said difference in gain facilitating in providing said third signals with substantially non-repetitive patterns.

7. Apparatus according to claim 5 wherein said second and third resistors are of different values whereby the gain provided to respectively said first and said second signals by said operational amplifier is of different values due to the different gains provided by said second and said third resistors, respectively, in combination with said first resistor, said difference in gain in cooperation with said difference in frequency between said first and second predetermined frequencies providing said third signals with substantially non-repetitive patterns.

* * * * *